UNITED STATES PATENT OFFICE.

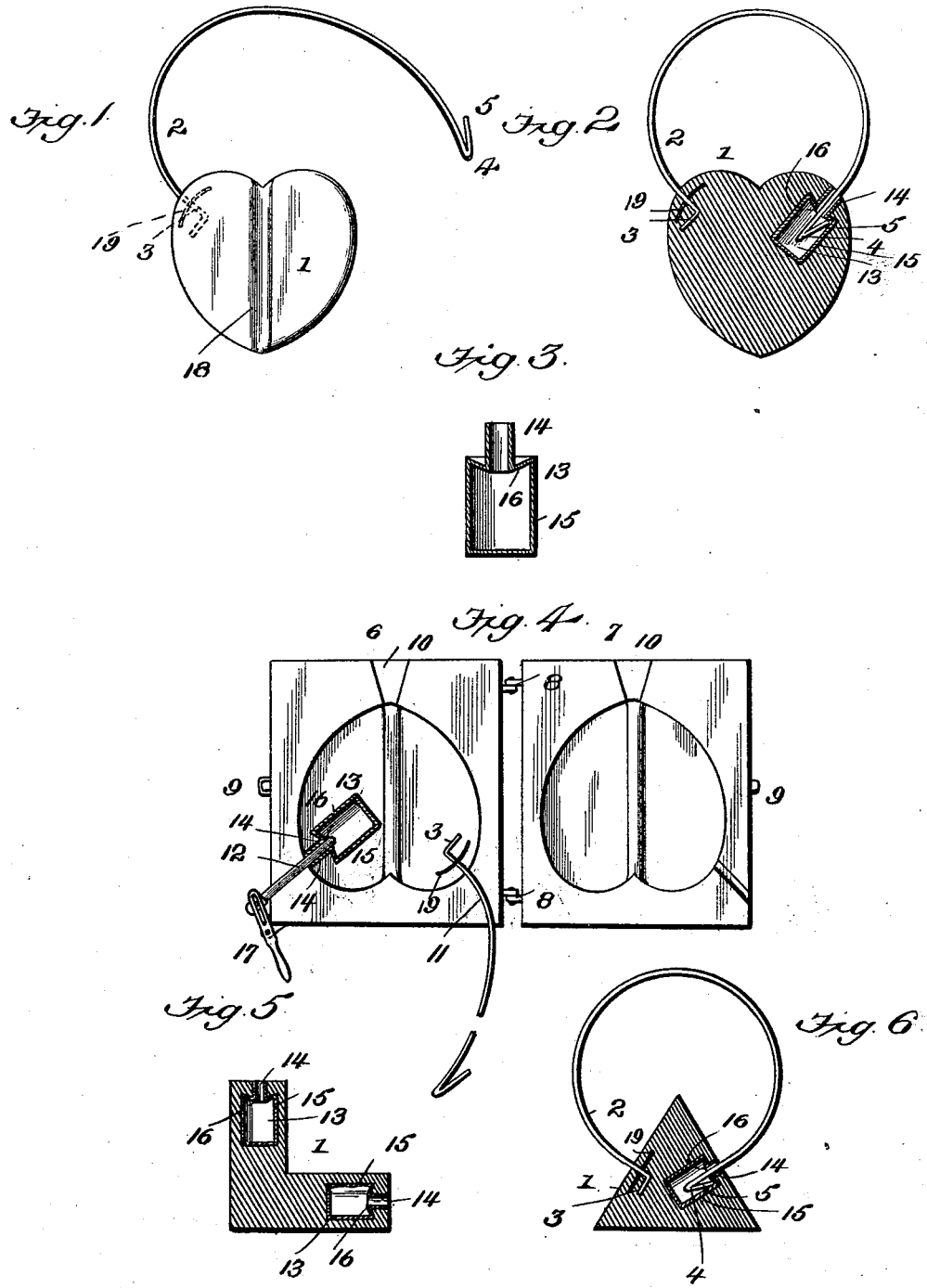

EDWARD L. TORSCH, OF BALTIMORE, MARYLAND, ASSIGNOR TO TORSCH & LEE, OF SAME PLACE.

SEAL.

SPECIFICATION forming part of Letters Patent No. 521,427, dated June 12, 1894.

Application filed January 8, 1894. Serial No. 496,183. (No model.)

*To all whom it may concern:*

Be it known that I, EDWARD L. TORSCH, a citizen of the United States, residing at Baltimore, in the State of Maryland, have invented certain new and useful Improvements in Seals, of which the following is a specification.

My invention relates to improvements in seals for freight cars, express boxes, or other receptacles which it is desired to seal so as to prevent opening the same without detection, which seals may also be used for theater checks or similar purposes, and its object is to provide a seal which shall be more economical in manufacture than those of a similar class at present in use, and which shall possess the further superiority in that it shall be impossible to open or tamper with the same without breaking the seal or leaving evidence of such tampering.

Car seals have already been devised which are constructed of pottery, cement, or other hard and frangible material having a cavity adapted to receive and retain the hooked end of a wire to be passed through a pair of staples in the box or car which it is desired to seal, and through a perforation in the seal leading into said cavity, but in all seals as at present constructed which are made of pottery or frangible material, so far as I am aware, the cavity in which the hook is retained is faced with the same material as the seal is composed of, that is to say, with frangible material. With such seals it is possible to drill a small perforation from the outside of the seal into the cavity, and then to pass a small needle-like instrument into the cavity and operate upon the hooked wire so as to permit the same to be withdrawn. The drilled hole may afterward be filled up with the pottery or cement, and being small will escape detection.

Now my invention is intended to prevent all such modes of tampering with car seals, and consists in providing in a car seal of frangible material a retaining cavity having a shoulder for the hook and having also a metallic lining, which forms a complete protection to the retaining hook when the latter has been inserted into the cavity. Not only is the cavity itself, but the perforation leading thereto, lined with metal in my invention, thus preventing any tampering with the shoulder at the end of said perforation, and giving additional security.

A further improvement lies in the fact that with my construction it is not necessary to withdraw the core which has to be provided to form the cavity, nor is it necessary to fill in any parts of the body of the seal, after the molding has taken place. The manufacture is thus greatly simplified and cheapened.

My invention also consists in the construction, combination and arrangement of the parts, hereinafter specified and more particularly pointed out in the claim.

Referring to the drawings, Figure 1 is an elevation of my improved device, and Fig. 2 is a central vertical section showing the same closed or with the hook in position. Fig. 3 is an enlarged sectional view of the metallic core. Fig. 4 is a view of the mold sections opened with the core in place; and Figs. 5 and 6 are views of modified forms of my device.

1 represents the body of the car or freight seal, which in Figs. 1 and 2 I have shown as heart-shaped, but it may be made of any desired configuration, as L-shaped or triangular as shown in Figs. 5 and 6.

2 is the wire, which in operation is passed through the staples of the car or through other devices which are to be secured together, and one end of which is shown in Figs. 1 and 2 permanently secured to the body of the car seal having a bent retaining portion 3 at the end around which the body of the seal is conformed. The other end is hooked as shown at 4, the terminal portion 5 of the hook being adapted to be pressed into close contact with the adjacent portion of the wire and to spring out from the same when released from such pressure.

Referring now to Fig. 4, 6 and 7 are the mold sections hinged as at 8, and provided at their outer edges with engaging portions 9 of an ordinary locking device for locking the mold sections together. 10 is the pouring gate or sprue of the mold. 11 is a channel or recess for holding the wire 2 in the necessary position to be secured in the seal body by the operation of molding. 12 is a rod upon the end of which is placed, so as to project into the mold, the hollow cylindrical metallic core 13, which consists of a narrow portion 14 serving as a lining for the aperture into the cavity, the internal diameter of said portion 14 being about twice that of the wire, a major portion 15 which serves to line the cavity or receptacle for the hooked end of the wire, and a beveled or oblique conical shoulder 16 engaging the end of the hook and spreading the same upon any attempt at withdrawal thereof.

The metallic core 13 and the wire 2 being placed in position in the mold sections, and the mold being closed, the liquid or plastic material is poured into the mold through the sprue 10. The rod 12 is then withdrawn to the edge of the mold, either by hand or by a lever 17, and when the mold is opened the hollow metal core 13 and wire 2 will be in the desired positions in the body of the seal.

In Fig. 5, I have shown the seal provided with two such metal-lined cavities, so that a wire hooked at both ends may be passed into and secured first in one cavity, and then in the other.

For the purpose of facilitating the fracture of the seal when it is desired to open the car or other receptacle so sealed I provide a groove 18 extending across the seal. The fracture will then take place along the line of least thickness.

In order to prevent the seal being tampered with by cutting the wire 2 close to the end 3, and replacing the end of the portion so cut in the seal, I provide a metal plate 19 between the bent portion 3 of the wire and the surface of the seal. Thus if one attempts to tamper with the seal in the way above described, he will find it impossible to replace the end of the cut wire by reason of his inability to perforate said plate without leaving evidences of the seal having been tampered with.

An important use of my invention is that of serving as a check for identifying persons who may desire to leave theaters, dancing pavilions or other places of amusement temporarily and to return thereto, in cases where no repayment is required for such readmittance. In such cases the seal is made of small size, and of an ornate and pleasing appearance, and the wire is passed preferably through a button-hole of a garment of the person to be identified.

Having thus fully described my invention, what I claim, and desire to secure by Letters Patent, is—

A seal composed of frangible material adapted for use with a shackle wire, having a cavity for receiving the barbed end of said shackle wire, and a shoulder in the cavity adapted to retain said barbed end, said cavity being lined on all sides with a metallic lining, substantially as described.

EDWARD L. TORSCH.

In presence of—
G. W. S. MUSGRAVE,
A. W. BOWLING.